United States Patent [19]

LaPlante

[11] Patent Number: 4,602,155
[45] Date of Patent: Jul. 22, 1986

[54] ZERO REFERENCE GENERATING METHOD AND APPARATUS FOR OPTICAL ENCODERS

[75] Inventor: Dale LaPlante, Goleta, Calif.

[73] Assignee: BEI Electronics, Inc., Santa Barbara, Calif.

[21] Appl. No.: 517,322

[22] Filed: Jul. 25, 1983

[51] Int. Cl.$^4$ .............................................. G01D 5/34
[52] U.S. Cl. .......................... 250/231 SE; 250/237 G
[58] Field of Search ..................... 250/231 SE, 237 G; 356/395, 374; 340/347 P; 33/125 A, 125 C

[56] References Cited

U.S. PATENT DOCUMENTS

| | | | |
|---|---|---|---|
| 3,187,187 | 6/1965 | Wingate | 250/231 SE |
| 3,326,077 | 6/1967 | Vandemeer | 88/14 |
| 3,749,925 | 7/1973 | Hertrich | 250/231 SE |
| 3,982,106 | 9/1976 | Stutz | 250/237 G |
| 4,451,731 | 5/1984 | Leonard | 250/231 SE |
| 4,477,189 | 10/1984 | Ernst | 250/237 G |

FOREIGN PATENT DOCUMENTS

| | | |
|---|---|---|
| 1203787 | 9/1970 | United Kingdom . |
| 1472876 | 5/1977 | United Kingdom . |
| 2067282 | 7/1981 | United Kingdom . |
| 2104648 | 3/1983 | United Kingdom . |

Primary Examiner—David C. Nelms
Attorney, Agent, or Firm—Limbach, Limbach & Sutton

[57] ABSTRACT

An improved apparatus for generating an index signal in incremental encoders, wherein an index sequence of code elements is provided on the code disc, and the degree of registration between the index sequence and a mask sequence is detected, and further wherein the mask sequence and index sequence are configured so that there is maximum registration of the elements between the index sequence and mask sequence for the index position of the code disc and the degree of registration for all other angular positions of the code disc is at or below a predetermined background registration level, and so that the degree of registration for angular positions adjacent to the index or zero reference position is greater than zero and preferably no greater than the background registration level.

16 Claims, 5 Drawing Figures

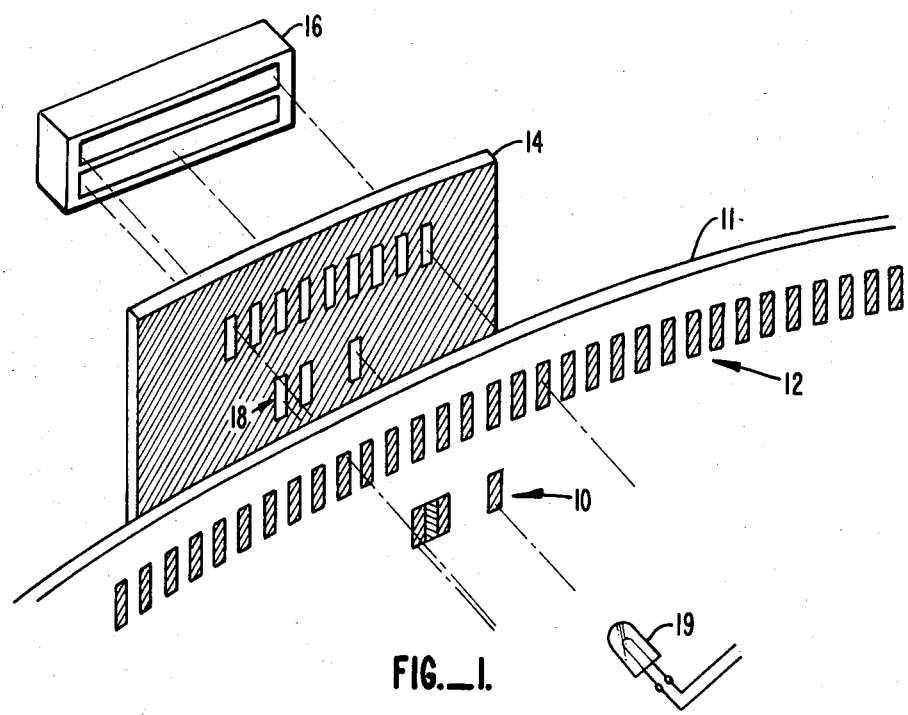
FIG._1.
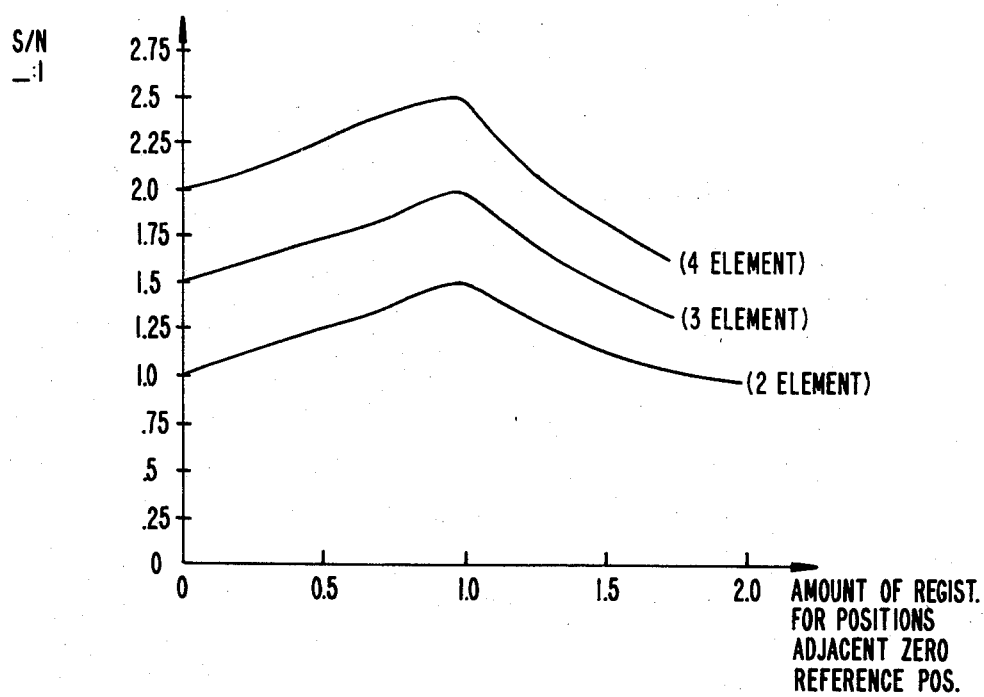
FIG._5.

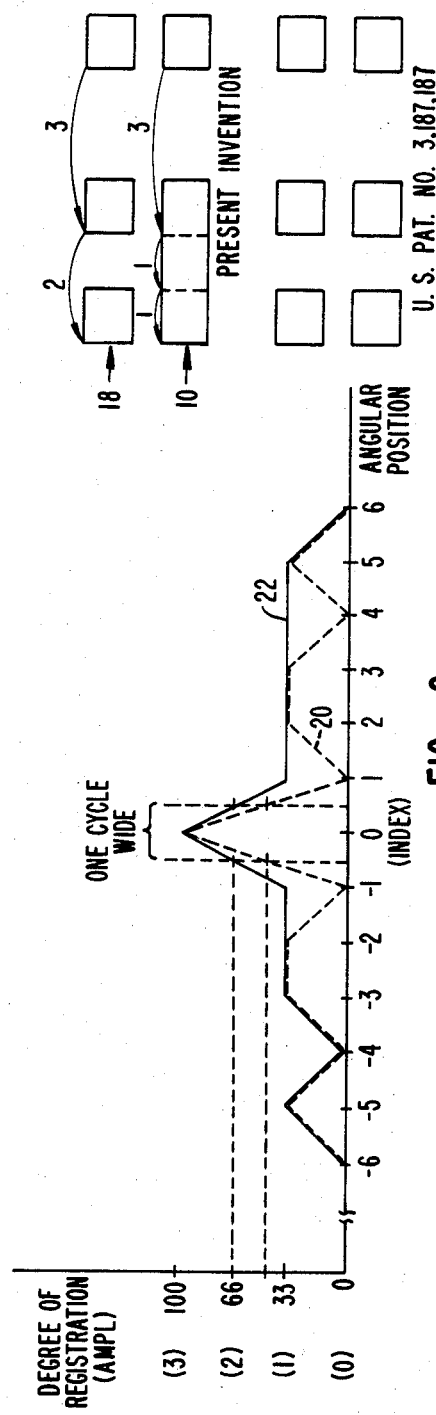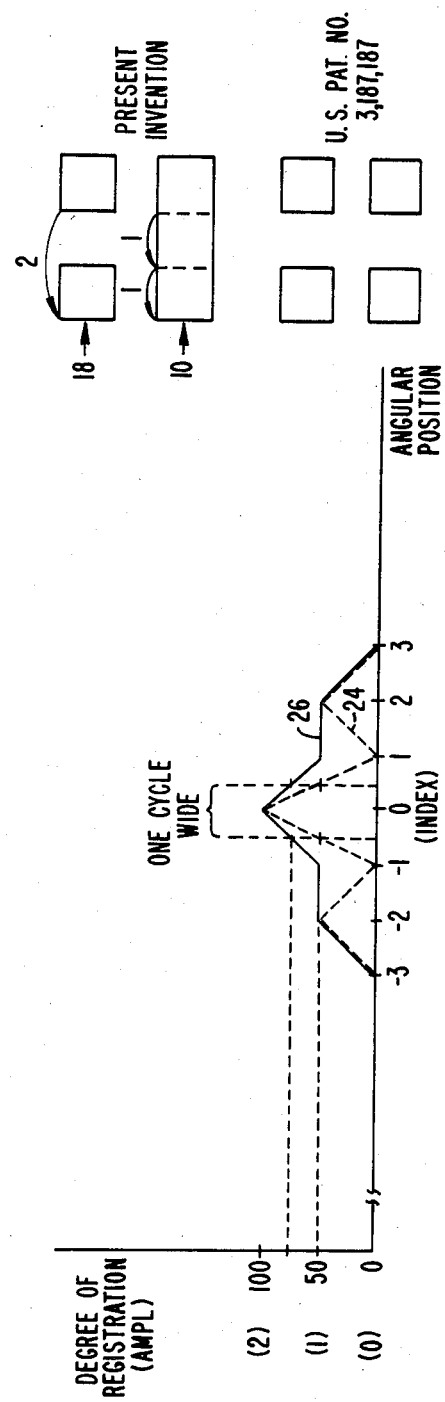

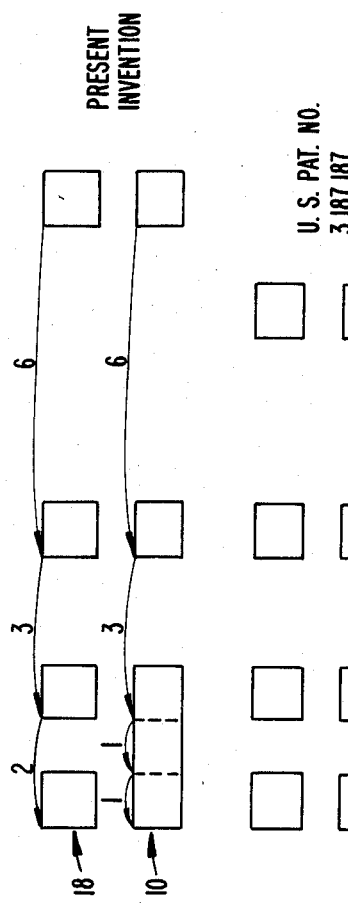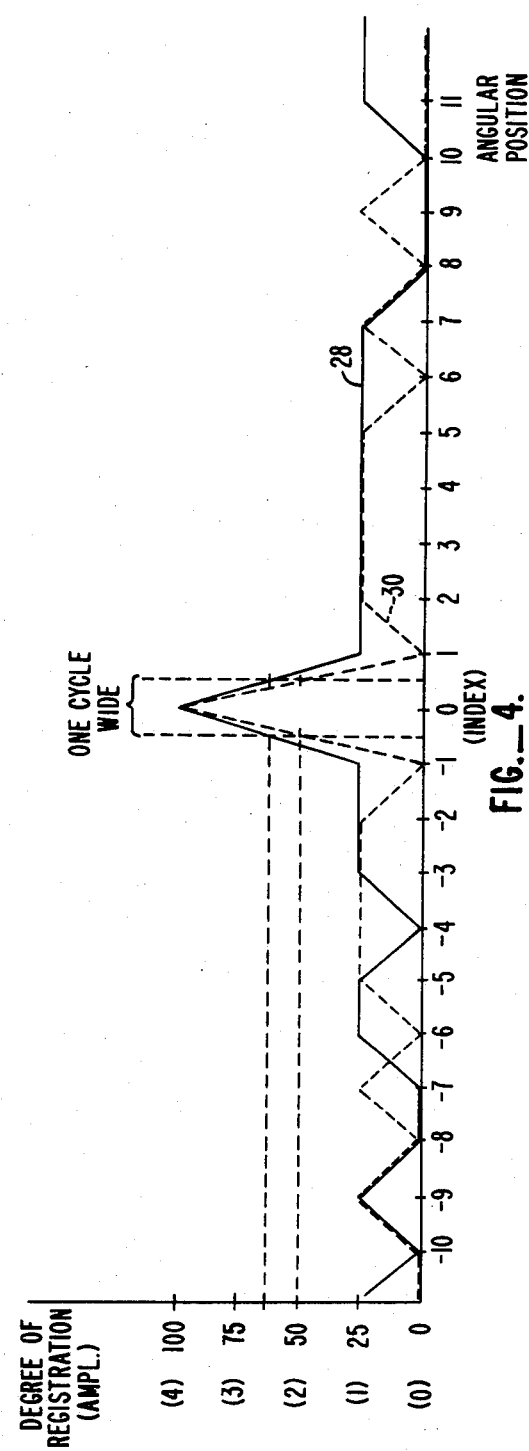
FIG._4.

ZERO REFERENCE GENERATING METHOD AND APPARATUS FOR OPTICAL ENCODERS

TECHNICAL FIELD

The present invention is directed to a method and apparatus for generating a reference signal from a rotating body and, in particular, to a method and apparatus for generating an index mark or zero reference signal in an optical encoder.

BACKGROUND ART

Optical encoders are typically used to provide positional information for rotating shafts. To do this, the optical encoder provides a code disc which is attached for rotation to the shaft of interest. The code disc includes code elements which are positioned circumferentially on the disc. Detector means are provided which are fixed in position with respect to the rotating code disc and which are positioned in registration with the path of the code elements on the disc. As the code disc is rotated by the rotating shaft, the code elements are translated with respect to and through various degrees of registration with the detector means. In absolute encoders, there is a unique set of code elements assigned to each angular position of the disc. Thus each angular position is uniquely identified, and the detector means outputs a signal representative of the code elements currently in registration with the detector means.

With incremental encoders, the code elements for each angular position are the same; however, the detector means count the number of code elements which are caused to pass in registration with the detector means when the code disc is rotated, so that the total number of elements counted for a given rotation of the disc is proportional to the number of angular positions through which the code disc was rotated. In other words, the code elements define incrementally spaced angular positions of the code disc.

Due to the lack of a unique code for each angular position of incremental encoder code discs, an index signal is often required to be generated to indicate some reference point on the disc so that counting means in the detector can have a starting point to which the count can be referenced. This index signal is typically generated by a set of code elements which are separate from the code elements in the main track of the code disc.

The typical detector means include a mask which bears the same index sequence of code elements as found on the code disc, as well as means for detecting the degree of registration between the code disc index sequence and the mask index sequence of code elements. Occasionally, a single code element is used as the index mark. However, it has been found that a multiplicity of code elements which have been arranged in special sequences are required to provide an index signal of sufficient resolution and amplitude to be satisfactory for a majority of optical encoder applications.

In order to detect the registration of the sequences, the code disc and mask are positioned between a light source and a photodetector. The index sequence on the code disc and the mask index sequence collectively modify the light which impinges upon the photodetector from the light source. Typically, no light is permitted to pass to the photodetector through the code disc and the mask when the respective sequences are totally out of registration with one another. Similarly, a maximum amount of light passes to the photodetector when there is maximum registration between the code disc index sequence and the mask index sequence.

Preferably, for all other degrees of registration the amount of light which is permitted to pass through to the photodetector is kept small. This, coupled with the requirement that the angular resolution provided by the index or reference signal be at least as precise as the angular position resolution provided by the code elements in the main track of the code disc, results in an index signal which is usually the weakest signal from the optical encoder. Thus, special techniques have been employed to enhance the signal characteristics of this index signal. Illustrative of these is U.S. Pat. No. 3,187,187 to Wingate. In the patent to Wingate, a special index sequence of slits is positioned transversely on the code disc and apart from the main track of the code disc. The sequence bridges several consecutive angular positions of the code disc. A mask, having a pattern identical to the index sequence is employed in conjunction with a detector. The detector detects the degree of registration between the mask and the index sequence as the disc rotates.

The physical distribution of the code elements in the index sequence and mask sequence is selected so that the degree of registration between individual elements is at a maximum when the code disc is at the index or zero reference position. For all other positions of the code disc, the degree of registration is below a designated level, typically one element.

In order to accomplish this, the code elements in the index sequence are arranged to have a selected spacing therebetween determined by a specific mathmetical relationship. In U.S. Pat. No. 3,187,187, this mathmetical relationship is defined in terms of numerical series; namely, 2, 3, 4, 6, 8, 12, 16, 24, etc. or 2, 3, 6, 8, 11, 16, 17, 20, 22, 24, etc., in which the numbers represent the spacing (in terms of code element widths) between the leading edges of successive code elements. Under this arrangement, no spacing between any two successive code elements is equal to any other spacing or to the sum of any group of immediately successive spacing.

When the above numerical series are employed, all angular positions of the code disc, except the index position, will exhibit a degree of registration between the mask sequence and the index sequence below some background registration level. At the index position of the code disc, the degree of registration is at a maximum and the detector output is large. However, the degree of registration is always zero for positions to either side of the index position. Although this further maximizes the change in detector output magnitude between the index or zero reference position and the positions adjacent thereto, there are certain disadvantages to this configuration.

It has been found that, despite this large output magnitude signal the signal-to-noise ratio therefor is often unsatisfactory. The relative magnitudes of the degree of registration for the index position and for the background registration provide a signal-to-noise ratio which is indicative of the quality of the index signal being generated.

In practice, a "safety factor" is applied in using the zero reference signal from the detector in the generation of an index signal at the encoder output. The safety factor takes into consideration variation of the signal over temperature, component aging, and different operating conditions of the encoder. For example, due to frequency response limitations in the detector means, the higher the speed at which the optical encoder is operated, the lower the output of the detector means will be. Additionally, the period-width of the index signal is related to the resolution of the encoder, such that for higher resolution encoders smaller period-width index signals are required.

Typically, the "safety factor" is implemented in an optical encoder by selecting a threshold level on the index signal waveform where the waveform is one code element wide. It is to be understood that the threshold levels selected are a matter of design choice which involves the trade-off of performance of the encoder in other respects. Thus, it is not a requirement that the threshhold level be set at the one-code-element wide point in order to properly practice the present invention.

The above can be better understood by considering that the registration between a code element in the index sequence and one of the elements in the mask sequence proceeds from a state where the elements are initially out of registration with one another, through a state where registration increases until full registration is achieved, and then through a state of decreasing registration. Finally the elements fall out of registration with one another. The waveform for such a progression takes the shape of a triangle. The left side of the triangle occurs as the two elements first begin to come into registration with one another. The peak of the triangle occurs as the two elements are in full registration with one another, and the right side of the triangle occurs as the two elements are falling out of registration with one another. The one-code-element-wide point is selected symmetrically about the peak of the triangle to correspond to the points on the triangle where the triangle is as wide as one of the code elements, i.e. where movement along the curve between the points corresponds to the angular displacement of the code disc through a distance equal to the width of a code element.

It is to be understood that the height of the triangle is a function of the number of code elements in the index sequence. It is also to be understood that the width of the triangle is related to the width of the code elements.

In practice, the index sequences which are actually used to generate the index signal are limited in the number of elements which practicably can be used. This is because, as the number of elements in the index sequence increases, which corresponds to an increase in the physical area which must be monitored, there is a rapid decrease in the optical efficiency of the detector. A large number of elements in the index sequence requires large area sensors. In turn, large area sensors exhibit greater capacitance effects than detectors for smaller areas, hence a limited frequency response. This capacitance effect increases at a faster rate than the increase in signal-to-noise ratio due to more code elements.

A further limitation has been found regarding the minimum number of code elements which can be used. When the safety factor, as discussed above, is applied to selecting a threshold level on the registration waveform from the detector, it has been found that the signal-to-noise levels for a one or two element sequence configured according to the teachings of the patent to Wingate are unacceptable, and that the level for a three-element sequence is barely adequate.

DESCRIPTION OF THE INVENTION

These and other problems of the prior index signal generating means are overcome by the present invention of an improved optical encoder having a code disc supported for rotation on a stationary member wherein a zero reference signal is generated by comparing the degree of registration between a first set of indicia on the code disc and a second set of indicia fixedly positioned on the stationary member, wherein the first set of indicia include a first sequence of code elements which are staggered in positional relation with one another; and further wherein the second set of indicia include a second sequence of code elements which are staggered in positional relation to one another; and further wherein the degree of registration between the first sequence of code elements and the second sequence of code elements is at a maximum for a predetermined zero reference position of the code disc, and at or below a background registration level for all other angular positions of the code disc; and further wherein the code elements are arranged in each set so that the degree of registration for the angular position to either side of the zero reference position is greater than zero and no greater than the background registration level. Preferably, the degree of registration for the adjacent positions corresponds to the background registration level.

It is, therefore, an object of the present invention to provide an improved optical encoder wherein the reference signal generating means generates an index signal corresponding to a reference point on the code disc and further wherein the signal generated for the angular positions of the code disc to either side of the reference position are at a level which is greater than zero and no greater than the background reference level of the reference generating means.

These and other objectives, features and advantages of the present invention will be better understood upon consideration of the following detailed description of certain preferred embodiments when taken in conjunction with the accompanying drawings.

BRIEF DESCRIPTION OF THE DRAWINGS

FIG. 1 illustrates the positioning of a light source, code disc, mask and detector in accordance with the present invention.

FIG. 2 is an illustrative comparison of the output signals of the reference generating means for a three-element sequence according to the present invention as compared to a three-element sequence of the prior art.

FIG. 3 is an illustrative comparison of the output signal from the reference generating means for a two-element sequence according to the present invention in comparison to a two-element sequence of the prior art.

FIG. 4 is an illustrative comparison of the output signal of the reference generating means for a four-element sequence according to the present invention as compared to a four-element sequence according to the prior art.

FIG. 5 is a plot of the signal to noise ratios provided for different amounts of adjacent position registration.

DETAILED DESCRIPTION OF THE INVENTION

U.S. Pat. No. 3,187,187, and U.S. Pat. No. 3,995,156 are hereby incorporated by reference.

U.S. Pat. No. 3,995,156 is illustrative of a typical configuration for an optical encoder. Shown therein is a stationary member, such as a housing, a code disc, code elements arranged circumferentially on the code disc to form a main track, and photodetector means for detecting individual elements within the main track as the code disc is rotated past the detector means by the shaft of interest.

FIG. 1 illustrates a typical arrangement of the code sequence 10 employed to generate an index mark in relation to a main track 12, a mask 14, and detector means 16. As is apparent from U.S. Pat. No. 3,187,187 optical detector means can be employed to measure the degree of registration between the index sequence 10 on the code disc 11 and an identical sequence on the mask 14. In FIG. 1 the code disc 11 is illuminated by a light source 19 such that the degree of registration between the index sequence 10 on the code disc 11 and the sequence 18 on the mask 14 determines the amount of light which is permitted to fall onto detector means 16, such as a photodetector. The greater the degree of registration, the larger the photodetector output. Conversely, the smaller the degree of registration, the lower the photodetector output.

For purposes of the description provided herein, it is to be understood that optical detector means are employed to determine the degree of registration between the index sequence 10 and the mask sequence 18. However, it is also to be understood that the present invention is equally applicable to other detection means such as capacitive detection, magnetic detection, and the like.

Referring to FIG. 2, the waveform represented by the dotted line 20 is representative of the output signal from the detector means 16 for a three-element sequence, which is positioned on the code disc 11 and formed according to U.S. Pat. No. 3,187,187, as the sequence falls in and out of registration with an identical pattern in the mask. As can be seen from the figure, the signal output level is at a maximum, i.e., three units when the index position is reached.

In interpreting the waveforms shown in the figures, it is to be understood that the units of the horizontal scale correspond to units of angular position of the code disc which are referenced to an index or zero reference position of the code disc. The vertical scale represents units of registration (parenthesized) or the degree of registration, in percent. One unit of registration corresponds to the level out of the detector means 16 when only one element in the index sequence 10 and one element in the mask sequence 18 are in full registration with one another. For example, in FIG. 2, the maximum amplitude occurs at angular position zero (i.e. the index position) and has an amplitude which corresponds to three units. The bottom right hand portion of each figure illustrates the relative positions of the elements in the index sequence and the mask sequence when the code disc is in the index position. Thus, in FIG. 2 it can be seen that when the three element index sequence, constructed according to the patent to Wingate, is at the index position, there will be three code elements in full registration with one another and, thus, an amplitude of three units from the detector means.

From waveform 20 in FIG. 2, it can be seen that the background registration noise has an amplitude of one unit. In other words, for all angular positions of the code disc, except the index position, the registration of the index sequence with the mask sequence will have a magnitude which is equal to or less than one unit. Thus, from FIG. 2, it can be seen that for the non-index-position angular positions the degree of registration varies from between no registration at all to full registration between only one element in each sequence.

Preferably, the index sequence on the code disc and the index sequence in the mask are selected so that the background registration level is minimized. Theoretically, for index sequences in which the code elements are spaced according to some multiple of the width of the code elements used, there will be a background registration level of at least one unit. The index code sequences in the patent to Wingate are selected so that the background registration level is no greater than one unit. It is to be understood that, preferably, the index code sequences of the present invention are similarly selected so that the background registration level is no greater than one unit.

Also illustrated in waveform 20 of FIG. 2 is the threshold level which would be selected if a safety factor corresponding to one cycle width were desired. This threshold level will be one and one-half units. With a background registration level of one unit, this translates to a signal-to-noise ratio of one-and-a-half to one.

It has been discovered that this signal-to-noise ratio can be substantially improved by modification of the code sequence used in generating the index mark. In FIG. 2, the waveform 22, which is drawn with a solid line, illustrates the output waveform from the detector for the registration of the code sequences 18 and 10 shown in the upper righthand corner of the figure. The use herein of reference designations 18 and 10 to designate the code sequences is done as a matter of convenience and in order to define one possible relationship between the code sequences of the present invention and their use as masks or index code sequences in the arrangment of FIG. 1. It is to be understood that the code sequences can be used interchangeably as masks or indexes and vice versa. These sequences are formed according to the present invention. Waveform 22 has the same maximum value, and the same background registration level as the waveform for the three element code sequence of U.S. Pat. No. 3,187,187. However, upon comparison of the threshold levels for a one-cycle wide safety factor, it is readily apparent that the signal-to-noise ratio for waveform 22 has been improved substantially. From FIG. 2, it can be seen that the one-cycle wide level on waveform 22 has an amplitude of two units. Thus, the threshold of waveform 22 is twice as far above the background registration level as the threshold level for waveform 20.

It has been discovered that the reason for the lower signal to noise ratios when using the code sequences taught in the patent to Wingate, is that for the angular position to either side of the index position the index sequences taught always yield a zero registration. Thus, the corresponding waveform always returns to zero before increasing to the maximum registration level thereof.

According to the present invention, it has been determined that if the waveform does not return all the way to zero for the angular positions to either side of the index position, a substantially improved signal-to-noise ratio, i.e., a greater one-element-wide threshold level, is obtainable. In order to implement this discovery, the code patterns shown in the upper righthand corner of each of the figures have been invented. Note that, for FIGS. 2 and 3, while one of the code sequences 18 is identical to that for the sequence taught in the patent to Wingate, the other code sequence 10 includes an additional element which bridges two pre-existing elements. The result is that, for positions to either side of the maximum registration position, there will be a degree of registration corresponding to the background registration level, i.e. one unit, instead of zero registration.

It is to be understood that the sequences of the present invention can be used interchangeably on the code disc or in the mask. It is also to be understood that the patterns shown in the figures represent but one implementation of the present invention for the number of code elements shown therein.

There is an added benefit in providing an index sequence 10 and mask pattern 18 which produce the waveform 22 in FIG. 2. The magnitude rate of change (slewing rate), which the detector means is required to follow for accurate detection of the waveform, is reduced under the present invention. As can be seen from FIG. 2, the magnitude of waveform 22 changes one unit between the plus one or minus one angular position and the threshold level. In contrast, waveform 20 changes one and one-half units between the plus one or minus one angular position and the threshold for that waveform. Accordingly, the waveform in 22 can be handled more easily by the detector means than can waveform 20. This becomes important when high rotational velocities cause the frequency of the waveforms, and thus the magnitude rate of change thereof, to increase.

It has been found that implementing the index sequence according to the present invention provides the greatest amount of improvement over previous index sequences arrangement for lower numbers of elements in the index sequence.

Referring to FIG. 3, it can be seen that when using a two-element pattern implemented according to the present invention, a threshold which is one-half unit above the background registration level can be achieved. Recall that for the two-element pattern according to the patent to Wingate, in FIG. 3, waveform 24, the threshold level using the safety factor was at the background registration level. The two-element pattern implemented according to the patent to Wingate thus provides a signal to noise ratio of 1:1 and as such is of little practical value.

In accordance with the present invention, a threshold level is obtainable for a two element sequence which is comparable to that found in the three-element pattern of the patent to Wingate. Thus, the present invention provides in a two-element pattern a safety margin which is comparable to a three-element pattern implemented according to the patent to Wingate. See FIG. 3, waveform 26.

Again, it should be noted, in connection with FIG. 3, that the waveform 26 generated according to the present invention begins at the background registration level as the index or reference zero point is approached. In contrast, waveform 24, produced by the pattern according to the patent to Wingate, returns to zero for the angular position to either side of the index or zero reference position.

In accordance with the present invention the two-element sequence of the patent to Wingate is modified by adding a linking element in one of the sequences 10. See FIG. 3. This provides the no-transition-to-zero characteristic of waveform 26.

Referring to FIG. 4, waveforms for a four-element pattern are shown, along with the patterns implemented according to the patent to Wingate and according to the present invention. Waveform 28 is illustrative of the registration waveform for the code sequences configured according to the present invention, while waveform 30 represents the waveforms obtained for sequences configured according to the patent to Wingate. As can be seen from the figure, an improvement of one-half units in threshold level can be obtained under the present invention.

From an examination of the patterns, at the top of FIG. 4, it can be seen that the code sequences according to the present invention differ from that taught in the patent to Wingate in two ways. First of all, an additional linking element has been added as in the case of the two- and three-element patterns. Additionally, the pattern has been modified so that the rightmost elements have been moved outward by two positions. One disadvantage of the four-element pattern, as constructed according to the present invention, is that a larger area detector is required over that in the patent to Wingate. However, the one-half unit increase in threshold level often outweighs this disadvantage.

From the waveforms in FIGS. 2 through 4, it can be seen that a substantial improvement in the threshold level of an index signal can be obtained by providing an index sequence and mask pattern which are constructed in a manner similar to that taught in the patent to Wingate, but which have been modified so that the degree of registration between the index sequence and the mask pattern does not return to zero for positions to either side of the index or zero reference position. Preferably, the degree of registration for the adjacent angular positions is substantially equal to the background registration level. In the preferred embodiment of the present invention, the same index sequence and mask sequence as taught in the patent to Wingate are used, except that one of the sequences is modified to have an added linking element which links the two elements in the modified sequence which are closest to one another.

FIGS. 2, 3 and 4 illustrate the preferred implementation of 3 element, 2 element and 4 element index sequences in accordance with the present invention. Using the terminology of the patent to Wingate, these sequences can be expressed as follows: (1) three element sequence—(2, 3) and (1, 1, 3); (2) two element sequence—(2) and (1, 1); (3) four element sequence—(2, 3, 6) and (1, 1, 3, 6), wherein each number represents the leading-edge to leading-edge distance between consecutive code elements in the (indicated in FIGS. 2-4 by arrows) sequence in terms of units of code element width.

It is to be noted that, while the code disc index sequence and the mask index sequence in the patent to Wingate are identical, the code disc and mask sequences, 18 and 10, respectively, of the present invention are different. In the preferred embodiment, an additional code element is added to one of the sequences.

Thus, in accordance with the present invention, the 3 element sequence includes two sequences: a sequence 18 in which the leading edge of the second element is two units away from the leading edge of the first element, and in which the leading edge of a third element is three units away from the leading edge of the second element; and a sequence 10 in which the leading edge of the second element is one unit away from the leading edge of the first element, in which the leading edge of a third element is one unit away from the leading edge of the second element, and in which the leading edge of a fourth element is three units away from the leading edge of the third element.

The configuration for the two-element and four-element sequences of the present invention can be described in a similar manner.

It is to be understood that other code sequences which implement the teaching of the present invention exist, and that such sequences, so long as they provide a degree of registration for positions adjacent to the index or zero reference position which do not return to zero will be satisfactory.

It is also to be understood that some improvement can be realized in the signal to noise ratio for the index signal of an optical encoder in accordance with the present invention where the degree of registration for positions adjacent the index position of the disc fall anywhere within the range which is greater than zero and no greater than the background registration level.

It should also be recognized that the amount of registration for positions adjacent to the zero reference position can be greater than the background registration level and still provide an improvement over the prior art. This is demonstrated in FIG. 5 wherein the signal to noise ratio is plotted for adjacent-position levels which are greater than the background registration level. Curves for a two-element, a three-element and a four-element code sequence are provided. For all of the curves, the points on the vertical axis represent the signal to noise ratio provided when the patterns of the patent to Wingate are used. Each of the curves represents the signal to noise ratio provided when the registration level for adjacent position ranges from first greater than zero to approximately two units. The bold face portions correspond to signal to noise ratios which are greater than that provided by the patterns of the patent to Wingate. The peaks of the curves represent the levels provided by the sequences of the preferred embodiment of the present invention in FIGS. 2 through 4. While the other bold face portions provide levels which are degraded from the preferred embodiment levels, these levels are nonetheless an improvement over the prior art. These other levels can be realized by such techniques as changing the pitch, i.e., separation between elements increasing the vertical dimension of certain of the code elements, or the like.

The improved performance in optical encoders provided by the present invention can be seen upon considering the performance of an encoder utilizing the three-element sequence of the present invention. When a single-element index mark has been found to provide a frequency response parameter of approximately 20 KHz. When a 3-element sequence according to the present invention is utilized, a 100 KHz parameter is not unrealistic. In other words, a five-fold improvement can be realized.

The larger threshold values available under the present invention also permit improved performance from the detector means. It is well-known that, for the low-gain amplifiers typically utilized in the detectors, the phototransistors therein have lower gain for lower collector currents. The low threshold levels normally available from prior index mark generating schemes dictate that the detector phototransistors be operated at low collector current levels. When the index sequence of the present invention is utilized, a higher threshold level is provided. As such, higher collector currents will be present and the operating point of the phototransistors can be increased to enhance the gain of the phototransistors. As such, a substantial increase in the performance of the phototransistor can be realized.

In the preferred embodiment of the present invention, the index sequence 10 on the code disc 11 is opaque and the code disc 11 is clear. Conversely, the mask 14 is opaque and the mask sequence 18 is clear. This is illustrated in FIG. 1. This clear-field/opaque-field arrangement has been found to enhance the performance of the detector 16 by permitting the detector photo-transistors to be normally in an "ON", i.e., active, state during substantially all of each revolution of the code disc. Only when the mask sequence 18 and index sequence 10 come into registration will the phototransistors be placed into an off state. As is well known in the art, the response of a phototransistor is fastest when it is already in the active condition, as opposed to moving from an "OFF" to a "ON" condition.

To further enhance the operation of the present invention, a push-pull detection scheme is utilized in the preferred embodiment. As is well known in the art, in push-pull detection the presence or absence of light through a particular code element of mask sequence 18 is detected by a pair of phototransistors, or diodes. The apertures for these devices are positioned so that the dark period for one of the devices corresponds to the light period for the other device. The difference of the outputs of the devices is derived by way of a differential amplifier. Alternatively, push-pull or complementary tracks on the code disc can be used. The push-pull detection described above cancels out common mode signal variations to provide a more stable output signal.

The terms and expressions which have been used herein are terms of description and not of limitation, and there is no intention in the use thereof in limiting the scope of the claims herein or the embodiments shown.

I claim:

1. An improved optical encoder having a stationary member, a code disc supported for rotation with respect to the stationary member, indicia positioned on the code disc which define incrementally spaced angular positions of the code disc relative to the stationary member, and means positioned on the stationary member for sensing the indicia, the improvement comprising a first set of zero reference indicia positioned on the code disc and arranged in a first sequence;

a second set of zero reference indicia positioned on the stationary member and arranged in a second sequence different from the first sequence; and detection means positioned on the stationary member for determining the degree of registration between the first set of zero reference indicia and the second set of zero reference indicia corresponding to the incrementally spaced angular positions of the code disc relative to the stationary member, wherein the first set of zero reference indicia are ordered in relation to the second set of zero reference indicia so that the degree of registration therebetween corresponding to all incrementally spaced angular positions of the code disc relative to the stationary member is no greater than a predetermined background registration level, except for a selected zero reference position of the code disc, so that the degree of registration is maximized at the selected zero reference position, and so that the degree of registration corresponding to the angular positions of the code disc one angular position removed from the zero reference position is at the predetermined background registration level.

2. An improved method for generating a zero reference signal in an optical encoder having a stationary member, a code disc which is mounted for rotation with respect to the stationary member, indicia positioned on the code disc which define incrementally spaced angular positions of the code disc relative to the stationary member, and means positioned on the stationary member for sensing the indicia, including the steps of positioning a first set of zero reference indicia on the code disc; fixedly positioning a second set of zero refernce indicia with respect to the stationary member; and detecting the degree of registration, between the first set of zero reference indicia and a second set of zero reference indicia, corresponding to each of the incrementally spaced angular positions of the code disc, the improved method further including the steps of (a) forming the first set of zero reference indicia in relation to the second set of zero reference indicia so that the first set forms a first sequence of indicia and the second set forms a different second sequence of indicia, and so that the degree of registration between the two sets corresponding to all of the incrementally spaced angular positions of the code disc is no greater than a selected background registration level except for a selected zero reference position of the code disc, wherein the degree of registration between the two is at a maximum at the selected zero reference position; and (b) forming the first set of zero reference indicia in relation to the second set of zero reference indicia so that the degree of registration between the two, corresponding to an angular position of the code disc one incremental angular position to either side of the zero reference position, is at the selected background registration level.

3. An improved optical enclocer having a code disc supported for rotation with respect to a stationary member wherein a zero reference signal is generated by comparing the degree of registration between a first set of indicia on the code disc and a second set of indicia fixedly positioned on the stationary member for a plurality of incrementally spaced angular positions of the code disc, the improved optical encoder comprising a first sequence of code elements which are included in the first set of indicia and which are staggered in positional relation to one another;

a second sequence of code elements different from the first sequence of code elements which are included in the second set of indicia and which are staggered in positional relation to one another; and wherein the degree of registration between the first sequence of code elements and the second sequence of code elements is at a maximum for a predetermined zero reference position of the code disc, and no greater than a background registration level corresponding to all other angular positions of the code disc; and further wherein the degree of registration corresponding to the angular position of the code disc one incremental angular position to either side of the zero reference position is greater than zero.

4. The improved optical encoder of claim 3 further wherein the degree of registration corresponding to the angular position of the code disc one incremental angular position to either side of the zero reference position is at the background registration level.

5. The improved optical encoder of claim 3 further wherein the first sequence of code elements has a different positional arrangement from the second sequence of code elements such that the degree of registration corresponding to the incremental angular position of the code disc which is on either side of the zero reference position is no greater than the background registration level.

6. The improved optical encoder as recited in claim 3 wherein the first sequence of code elements includes three code elements which are spaced according to the mathematical series 2, 3 and further wherein the second sequence of code elements includes four code elements which are spaced according to the mathematical series 1, 1, 3 in which each code element has the same width, and each number in the mathematical series represents the leading-edge-distance between adjacent code elements in units of code-element-width.

7. The improved optical encoder as recited in claim 3 wherein the first and second sequences of code elements are spaced according to the mathematical series 2, 3 and further wherein, the elements spaced by two units in the second sequence of code elements are connected by a bridging code element in which each code element has the same width, and each number in the mathematical series represents the leading-edge-distance between adjacent code elements in units of code-element-width.

8. The improved optical encoder as recited in claim 3 wherein the first sequence of code elements includes four code elements which are spaced according to the mathematical series 2, 3, 6 and the second sequence of code elements include five code elements which are spaced according to the mathematical series 1, 1, 3, 6 in which each code element has the same width, and each number in the mathematical series represents the leading-edge-distance between adjacent code elements in units of code-element-width.

9. The improved optical encoder as recited in claim 1 wherein the first set of zero reference indicia includes a predetermined number of code elements and wherein the second sequence of zero reference indicia includes a different predetermined number of code elements.

10. The improved optical encoder as recited in claim 1 wherein the first set of zero reference indicia includes three code elements each having a unit width and the second set of zero reference indicia includes four code elements each having the same unit width, and further wherein two of the code elements in the first set are spaced apart from one another by one unit width while the remaining code element is spaced from the others by two unit widths, and further wherein three of the code elements in the second code set are juxtaposed to form an extended element having three unit widths, with the remaining code element spaced from the juxtaposed code elements by two unit widths.

11. The improved optical encoder as recited in claim 1 wherein the first set of zero reference indicia includes two code elements each having a unit width which are spaced from one another by one unit width, and further wherein the second set of zero reference indicia includes three code elements each having the same unit width and which are juxtaposed with one another to form an extended code element having a width of three unit widths.

12. An improved method of forming sequences of indicia for generating an index signal in an optical encoder having a code disc which is mounted for rotation with respect to a stationary member, a first sequence of indicia positioned on the code disc for rotation therewith, a second sequence of indicia positioned on the housing, said second sequence being identical to said first sequence, and means for detecting the degree of registration between the first and second sequences of indicia corresponding to incrementally spaced angular positions of the code disc, including the steps of (a) arranging the portions of the indicia within the first and second sequences of indicia so that there is maximum registration between the sequences whenever the code disc has an angular position which corresponds to a code disc index position, so that the degree of registration is no greater than a designated background level for all other angular positions of the code disc, and so that the degree of registration corresponding to each angular position of the code disc which is one incremental angular position removed from the index position of the code disc has a zero level, and (b) generating the index signal when the degree of registration rises above a predetermined threshold level which is greater than the designated background level, wherein the improvement comprises the additional step of (i) modifying one of the sequences so that the degree of registration corresponding to the angular positions of the code disc which is one incremental angular position removed from the index position is greater than zero.

13. The improved method of claim 12 where in step "(i)" includes the step of modifying the sequences so that the degree of registration corresponding to the angular positions of the code disc which are one incremental angular position removed from the index position is substantially equal to the background level.

14. The improved method of claim 12 wherein step "(i)" only one of the sequences is modified.

15. The apparatus of claim 1 wherein the first set of zero reference indicia are opaque and the code disc is transparent, and wherein the second set of zero reference indicia include transparent code elements positioned on an opaque background.

16. The apparatus of claim 1 wherein the detector means include a plurality of detectors arranged in a push pull configuration.

* * * * *